(12) United States Patent
Swierkowski et al.

(10) Patent No.: US 6,289,695 B1
(45) Date of Patent: Sep. 18, 2001

(54) VACUUM FUSION BONDING OF GLASS PLATES

(75) Inventors: Steve P. Swierkowski; James C. Davidson; Joseph W. Balch, all of Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/441,916

(22) Filed: Nov. 17, 1999

Related U.S. Application Data

(62) Division of application No. 09/039,522, filed on Mar. 16, 1998, now Pat. No. 6,131,410.

(51) Int. Cl.[7] ............................ C03B 23/20; B32B 31/04
(52) U.S. Cl. .................. 65/36; 65/42; 65/63; 65/152; 65/155; 156/87; 156/104; 156/106; 156/286
(58) Field of Search .................... 65/36, 42, 59.1, 65/59.2, 59.3, 63, 152, 154, 155, 357, 359; 156/87, 104, 106, 286; 228/44.3, 47.1, 49.4

(56) References Cited

U.S. PATENT DOCUMENTS 5,882,465 * 3/1999 McReynolds .

* cited by examiner

Primary Examiner—Michael P. Colaianni
(74) Attorney, Agent, or Firm—L.E. Carnahan; Alan H. Thompson

(57) ABSTRACT

An improved apparatus and method for vacuum fusion bonding of large, patterned glass plates. One or both glass plates are patterned with etched features such as microstructure capillaries and a vacuum pumpout moat, with one plate having at least one hole therethrough for communication with a vacuum pumpout fixture. High accuracy alignment of the plates is accomplished by a temporary clamping fixture until the start of the fusion bonding heat cycle. A complete, void-free fusion bond of seamless, full-strength quality is obtained through the plates; because the glass is heated well into its softening point and because of a large, distributed force that is developed that presses the two plates together from the difference in pressure between the furnace ambient (high pressure) and the channeling and microstructures in the plates (low pressure) due to the vacuum drawn. The apparatus and method may be used to fabricate microcapillary arrays for chemical electrophoresis; for example, any apparatus using a network of microfluidic channels embedded between plates of glass or similar moderate melting point substrates with a gradual softening point curve, or for assembly of glass-based substrates onto larger substrates, such as in flat panel display systems.

13 Claims, 2 Drawing Sheets

VACUUM FUSION BONDING OF GLASS PLATES

This application is a division of U.S. application Ser. No. 09/039,522 filed Mar. 16, 1998, now U.S. Pat. No. 6,131,410.

The U. S. Government has rights in this invention pursuant to Contract No. W-7405-ENG-48 between the U. S. Department of Energy and the University of California for the operation of Lawrence Livermore National Laboratory.

BACKGROUND OF THE INVENTION

The present invention is directed to fusion bonding of glass plates, particularly to vacuum fusion bonding of glass plates, and more particularly to an improved apparatus and method for void-free vacuum fusion bonding of glass plates within which are etched features, such as microstructure channels and ports.

Apparatus using a network of fluidic channels, such as microchannel arrays for chemical electrophoresis, involve the formation of the channels on one or both mating glass plates, for example, and the plates are bonded together, such as by fusion bonding. A common problem with fusion bonding is incomplete bonding of the areas, leaving thin, unbonded regions or voids. Even with the use of external force and pressure, voids are difficult to avoid. The concept of developing a partial vacuum between two substrates while maintaining an ambient or higher pressure outside the substrates has been used in mask aligners for some time, and this greatly enhances the area of close contact. The concept of using vacuum and fusion was recently demonstrated on glass, and that process is described and claimed in U.S. application Ser. No. 09/039,522 filed Mar. 16, 1998, now U.S. Pat. No. 6,131,410 issued Oct. 17, 2000, entitled "Vacuum Pull Down for an Enhanced Bonding Process," assigned to the same assignee.

The present invention solves the problem of conveniently applying the vacuum force with an apparatus that is compatible with the high temperatures needed for glass fusion bonding and is potentially useful for very large substrates that are patterned with small features. The present invention eliminates intermediate bonding layers which tend to fill small features etched into the substrates. Thus the present invention provides an improved apparatus and method for vacuum fusion bonding of large, patterned glass plates, such as microstructure channels for chemical electrophoresis.

SUMMARY OF THE INVENTION

An object of the present invention is to provide vacuum fusion bonding of glass plates.

A further object of the invention is to provide an improved apparatus for vacuum fusion bonding.

A further object of the invention is to provide an improved method for vacuum fusion bonding.

Another object of the invention is to provide an improved apparatus and method for vacuum fusion bonding of large, patterned glass plates.

Another object of the invention is to provide an apparatus and method for vacuum fusion bonding of glass plates wherein one or more of the plates included etched features, such as microstructure channels for chemical electrophoresis.

Another object of the invention is to provide void-free bonding of patterned and etched glass plates to form microchannels embedded between the glass plates.

Another object of the invention is to provide vacuum fusion bonding of glass plates having etched channels therein to form, for example, microchannel arrays having straight lengths of about 50 cm with over 100 channels that are about 10–200 microns wide and about 20–75 microns deep.

Other objects and advantages of the present invention will become apparent from the following description and accompanying drawings. The invention broadly involves vacuum fusion bonding of glass plates. More specifically, the invention comprises an improved apparatus and method for vacuum fusion bonding of large, patterned glass plates. One or both plates are patterned with etched features such as microstructure channels and vacuum pumpout moat and ports. One plate has one or more small holes which extend therethrough for connection to the vacuum pumpout fixture. The apparatus and method produce a complete fusion bond (void-free) of seamless, full-strength quality throughout the length and width of the plates. Current use of the invention, for example, is for fabricating microchannel arrays for chemical electrophoresis. Also, the invention can be used in the fabrication of any apparatus using a network for microfluidic channels embedded between plates of glass or similar moderate melting point substrates having a gradual softening point curve, such as certain plastics and alloys. Also, the invention can be used for the assembly of glass-based substrates onto larger substrates; for example, for integrating flat panel display tiles onto larger display screen systems.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The invention is directed to vacuum fusion bonding of glass plates and particularly to vacuum fusion bonding of glass plates wherein microfluidic channels are embedded between the plates. The invention involves an improved apparatus and a method for vacuum fusion bonding of large, patterned glass plates, for example, and the apparatus and method are particularly applicable for the fabrication of microchannel arrays, such as utilized in chemical electrophoresis or other apparatus using a network of microfluidic channels embedded between plates of glass or similar moderate melting point substrates. The invention eliminates intermediate bonding layers and the problems associated therewith.

Figure 1:
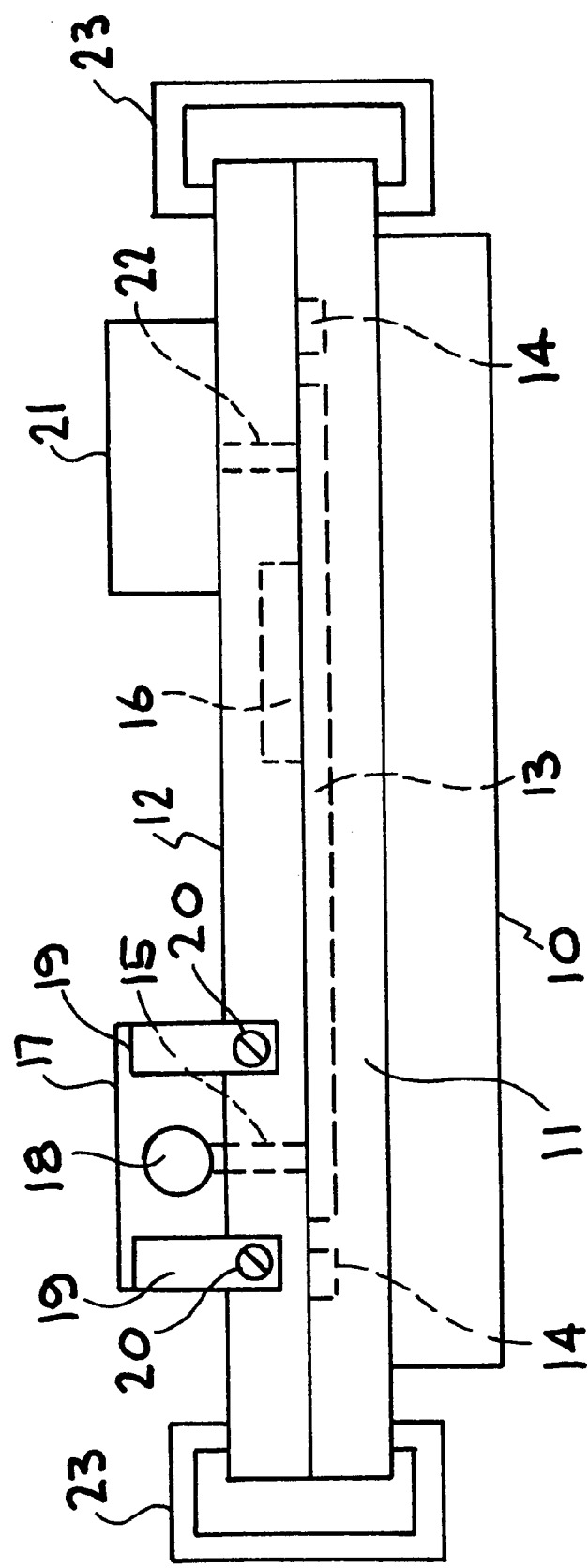
FIG. 1 is a schematic view of an embodiment of a vacuum fusion bonding apparatus made in accordance with the present invention.

The apparatus basically comprises three major components: a platform for fully supporting the plates during bonding and on which a bottom plate is located; a vacuum fixture (pumpout block) adapted to be mounted on a top plate; and a blank-off block adapted to be also mounted on the top plate. A bottom plate having a desired pattern formed therein on one side thereof and a top plate having at least two holes extending therethrough are positioned intermediate the platform and the pumpout block and blank-off blocks, as shown in FIG. 1, for vacuum fusing bonding of the bottom and top plates, as described in detail hereinafter. The plates are pulled together by vacuum in the holes and channels combined with the ambient furnace atmosphere of moderate pressure gas.

A SEM cross-section of a borosilicate glass microchannel, vacuum fusion bonded by the present invention, shows that it preserves the shape of the channel extremely well, with distortions upon fusing of less than a few (1–3) percent. The SEM showed that bond interface occurs horizontally across the top of the channel with no unbonded regions or voids, and there is no evidence of discontinuity or tendency to fracture along the interface when subjected to cleavage fracture forces.

Figure 2:
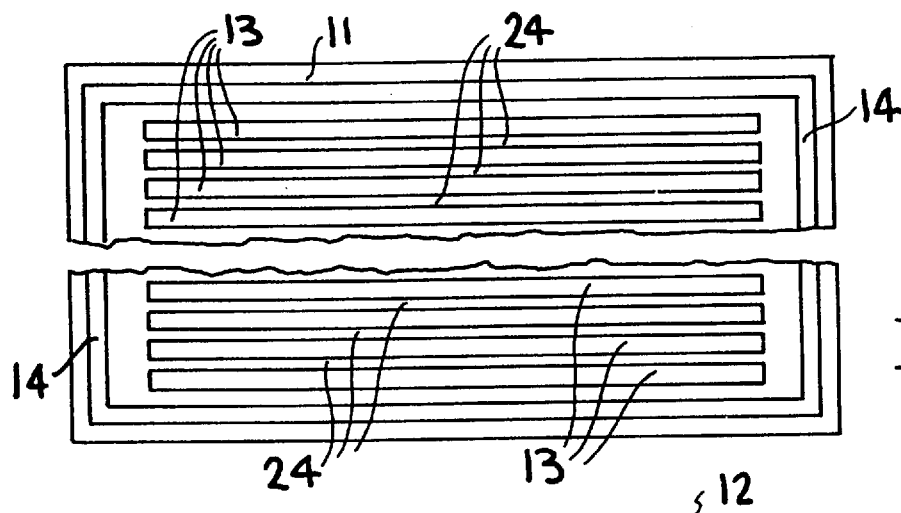
FIG. 2 is a partial, greatly enlarged top view of a bottom glass plate embodiment having microchannels and a vacuum pumpout moat etched therein, such as utilized in FIG. 1.
Figure 3:
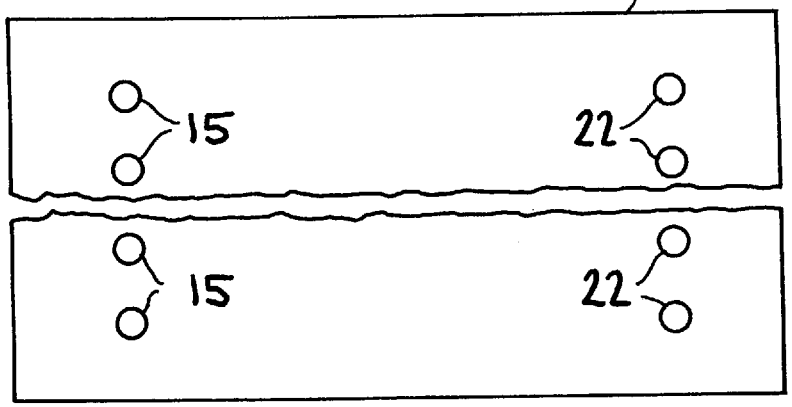
FIG. 3 is a partial, greatly enlarged bottom view of a top glass plate embodiment having multiple vacuum ports therethrough and etched grooves thereon.
Figure 4:
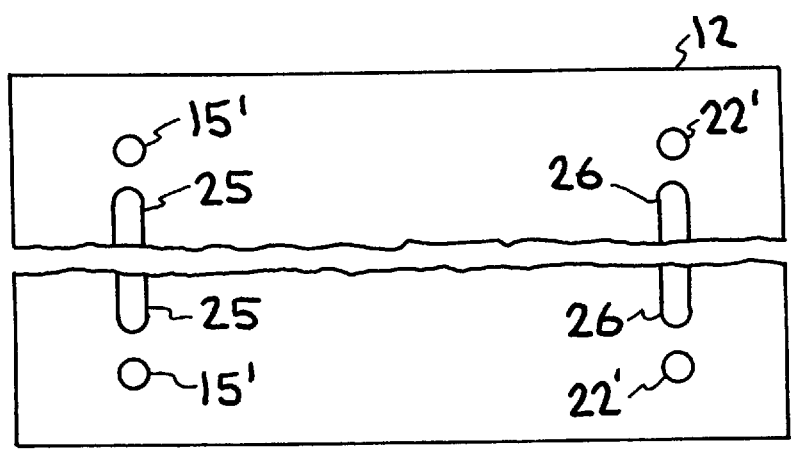
FIG. 4 is a view similar to FIG. 3, but with only two vacuum ports and interconnecting grooves.

Referring now to the drawings, FIG. 1 schematically illustrates an embodiment of the improved apparatus for vacuum fusion bonding glass plates, such as the embodiments illustrated in FIGS. 2–4.

The apparatus and glass plates, as shown in FIG. 1, comprise an oven platform 10, the first major component, constructed of material, such as a nitrided stainless steel, or high purity graphite, of 1 cm thickness with a fine upper surface ground finish, which fully supports the bottom and top glass plates 11 and 12 during bonding. The platform 10, which is located in an oven, provides a uniform temperature for the glass plates by virtue of its high conductivity, does not stick to the glass, and has a much higher coefficient of expansion than glass. The bottom glass plate 11 is patterned with small features 10–200 microns wide with comparable depths, such as microchannels 13, shown in greater detail in FIG. 2, that will be evacuated, as described hereinafter. The bottom plate 11 is also patterned with a moat 14, see FIG. 2, of a 4 mm width, for example, which surrounds the area to be bonded and is also evacuated, as described hereinafter. The moat 14 can be extended over the bottom glass plate 11 as much as necessary, in the unused areas, to generate large pressure differential binding forces compressing the two glass plates 11 and 12. The top glass plate 12 has several small vacuum pumpout openings or holes 15 (see FIGS. 1, 3, and 4) about 1 mm diameter, that go all the way through the plate 12 to mate with the moat 14 and microchannels 13 of bottom plate 11. The openings or holes 15 may be replaced by grooves, or slots, as shown in FIGS. 3 and 4, to assure vacuum communication to microchannels 13 and moat 14. Plate 12 may also have miniature features patterned into it, as indicated at 16, that need to be aligned to the bottom plate 11. The second major component of the apparatus, the vacuum pumpout block 17, is a small (e.g., 5×7.5×1 cm) sized block made, for example, of polished finish stainless steel that serves as a vacuum manifold 18 to connect the furnace vacuum supply on a bellows line to the top glass plate vacuum pumpout holes 15. The pumpout block 17, as shown in the FIG. 1 embodiment, has two stainless steel side rails or flanges 19 with set screws 20 that allow the block 17 to clamp and align to the top glass plate 12, without any contact to the bottom glass plate 11. The vacuum pumpout block face in contact with the glass plate 12 is lapped to a flat, polished finish for temporary vacuum sealing to the top glass plate 12. Block 17 also expands more than the glass, so that as the fusion cycle reaches high temperature, it releases itself from the glass plate 12, so as not to crush it with the set screws 20, but still maintain vacuum. The glass under the set screws 20 deforms with fusion temperatures, enabling easy release and avoiding damage to the glass plate 12 during cool down. The block 17 is provided with another set of flanges 19 and set screws 20 on the opposite side thereof to assure a fixed location and a vacuum seal between the block 17 and glass plate 12, particularly when plate 12 is of a wide width. The third major component of the apparatus, blank-off block 21, is, for example, a small steel block placed over holes 22 (see FIGS. 1, 3, and 4) in the top glass plate 12 to close off the end of the vacuum pathway. The holes 22 in top glass plate 12 are not needed for the bonding process but may be needed in the final application of the bonded glass plates (e.g., for inlets and outlets of fluids). Temporary glass plate clamps 23 are used to preserve alignments of plates 11 and 12 until vacuum is applied and can, for example, be simple strong spring steel binder clamps, such as the well-known C-clamps. The clamps are removed from around the edges of plates 11 and 12 before the fusion heat cycle.

FIG. 2 illustrates a top view of a partial, greatly enlarged embodiment of a glass plate, such as glass plate 11 in FIG. 1; and corresponding reference numerals have been utilized. The glass plate 11 may have a thickness of 1 mm to 10 mm, a width of 1 cm to 20 cm, and length of 10 cm to 50 cm, with microchannels 13 having, for example, a length of 50 cm, a width of 10–200 microns, and a depth of 20–75 microns, being separated by a distance indicated at 24, of 50 microns to 5 cm, with, for example, a number of 1 to 400 microchannels 13 on the plate 11. The moat 14, for example, may have a width of 1 mm to 4 mm, depth of 20 to 75 microns, and be located a distance of 1 mm to 10 cm from microchannels 13.

FIGS. 3 and 4 illustrate bottom views of partial, greatly enlarged embodiments of top glass plates, such as glass plate 12 in FIG. 1, and corresponding reference numerals have been utilized. The number of holes 15 in top plate 12 may correspond to the number of microchannels 13 in bottom plate 11. Holes 22, as pointed out above, are not needed for the bonding process of plates 11 and 12 but, as discussed below, are utilized to check the vacuum in the capillaries 13 and moat 14; thus the number and location of holes 22 will depend on the application for the bonded glass plates.

FIG. 4 differs from FIG. 3 in that FIG. 4 utilizes a pair of holes 15' and 22' and grooves 25 and 26 located intermediate holes 15' and 22' respectively. Like holes 15' and 22', grooves 25 and 26 provide communication between vacuum manifold 18 and microchannels 13.

Other arrangements of holes and/or slots in top plate 12 may be utilized, such as a combination of FIGS. 3 and 4, or an additional row of holes 22 which connect to the microchannels 13 and moat 14.

Key advantages provided by the apparatus and method of the present invention include: (1) can easily accommodate large plates of differing sizes (e.g., 10–50 cm); (2) enables accurate (sub 10 micron) alignment of the two glass plates, by virtue of the temporary clamping, followed by vacuum binding; (3) the support platform enables very uniform temperatures to be applied while maintaining a flat, smooth support for the glass composite to prevent gross sagging and warping; (4) the glass plates can be cleaned, assembled, and aligned in a clean room, which is imperative for low defects and high quality; and once the pumpout fixture is attached, they can be moved to a much dirtier environment typical of large furnaces; (5) the pumpout block is simple to fabricate, can be reused, and can accommodate a wide range of different microstructure patterns in the bottom glass plate;

and (6) the pumpout block and blank-off block need only cover a small part of the area of the glass plates; and they are independent and not rigidly connected.

The method of bonding the top and bottom glass plates to form a glass composite using the apparatus of FIG. 1 is integral to its success; and the apparatus is assembled upside down so that the top glass plate with holes in it goes down first onto the pumpout block and blank-off block. The method of the invention is carried out as follows:

1. First clean the glass plates 11 and 12 and pumpout fixture or block 17, especially to be free from all organic contaminants and particulates.
2. Place the pumpout block 17 and the blank-off block 21 on a flat table so that the surfaces to be mated to the glass are face up and approximately level.
3. Place the top glass plate 12 onto the pumpout and blank-off blocks with its bonding (bottom) face up and its pumpout holes 15 matched to the vacuum manifold 18 in the pumpout block 17 and the holes 22 covered by the blank-off block 21. The holes 15 and 22 may serve as input and output ports of the bonded composite assembly.
4. Place the bottom glass plate 11 with its microchannels 13 and moat 14 bonding (top) face down onto the glass plate 12.
5. Align the glass plates 11 and 12 to each other with the use of a magnifier or microscope so that the holes 15 in plate 12 are in vacuum communication with microchannels 13 and moat 14; the alignment may be done at the same time as placement of the bottom plate 11 to minimize plate to plate motion.
6. Once the glass plates 11 and 12 are aligned to each other, clamp the perimeter of the plates with spring C-type clamps 23. As a measure of proper contact and cleanliness, optical interference fringes should uniformly appear.
7. Align the plate pair (11 and 12) to the pumpout holes of vacuum manifold 18 of pumpout block 17 and assure the holes 22 are covered by the blank-off block 21, and set this position with the stainless steel set screws 20 via the side rails or flanges 19 of block 17. The assembly (components 11, 12, 17, and 21) are now assembled upside down from how it will be placed on the oven platform.
8. Invert the assembly and place on the oven platform 10 such that the bottom face of bottom glass plate 11 is in contact with and supported by platform 10.
9. Connect the vacuum manifold 18 of pumpout block 17 to the vacuum supply of an oven in which glass bonding will be carried out, apply vacuum, and check for leaks. The vacuum is in the range of 1 to 1,000 Pa.
10. Lift the pumpout block 17 a little and remove the C-clamps, whereby the vacuum should maintain all alignment and lift all the parts.

Properly connected and placed, the entire assembly can be tested by lifting the blank-off block, which has no connection to the plates, and it should lift that end of the plate assembly if the vacuum is adequate.

11. Lower the pumpout block 17 and its plates 11–12 and blank-off block 21 onto the oven platform 10. Alignment can still be checked by viewing through the glass plates, especially if strategically placed fiducials are present.
12. The assembly is now ready for the fusion heat cycle, which takes the plates up to the softening point (temperature of 650° C. to 680° C.) for about one hour; the oven ambient is a slight over-pressure of flowing high purity nitrogen; for example, a pressure of 500 to 2,000 Pa.

A complete fusion bond of seamless, full-strength quality is obtained through the composite plate, because the glass is heated into its softening point. The complete void-free bond is possible because of the large distributed force that is developed that presses the two plates together from the difference in pressure between the furnace ambient (high pressure) and the channeling and microstructures in the plates (low pressure). The apparatus and method allow the glass plates to be fully supported by a large, high thermal conductivity platform. This enables the plates to fully melt together forming a composite plate but in a manner that preserves the small microstructure features within the composite and supports the plates to prevent overall sagging or warping during the bonding cycle.

Using the apparatus and method of this invention, microchannel arrays on single glass substrates with a glass cover plate over the channels can be developed as an alternative to the current electrophoresis technology using arrays of discrete capillaries for DNA sequencing. This invention provides a number of advantages for building large arrays of electrophoresis microchannels for DNA sequencing. By fabricating the array of microchannels on a single glass substrate, the arrays of microchannels are very robust mechanically and can be handled without any special care. By means of photolithography and chemical etching techniques, the dimensions of rectangular cross-sectional channels can be optimized by making the channel depth thin (for larger area thermal cooling) to minimize the thermal dispersion of DNA bands while, at the same time, the channel width can be made large to increase the amount of dye-labeled DNA available for strong fluorescence signal generation and detection. This flattened channel is optimal for the shallow depth of focus laser fluorescent optical probe. The detection of the fluorescence signal is also made easier by having a flat optical window over the channels (provided by the flat glass cover plate or bottom channel plate) through which laser excitation of fluorescence occurs with less scattered light of the primary laser beam to contribute to the overall noise level.

Utilizing the apparatus and method of the present invention, microchannel arrays for electrophoresis with up to 101 channels, 48 cm long, have been fabricated in plates of borosilicate float glass. The channels are constructed with two plates of glass that are 7.6 cm wide and 58 cm long and are vacuum fusion bonded at 650 degrees C. The channel or bottom plate is 5 mm thick and typically has 12, 24, or 101 channels per plate; the channels are 150–200 $\mu$m wide and about 30–60 $\mu$m deep. The channel or bottom plate is bonded to a top or cover plate that has the input and output ports therein. Two different types of input ports have been tested. For a 5 mm thick top plate, input ports 1 mm in diameter have been ultrasonically milled through the top plate and registered with the channels in the bottom plate before the bonding process, as described above with respect to FIG. 1. For a 1.2 mm thick top plate, input ports as small as 150 $\mu$m have been fabricated (about the same cross-section as the channels) and these have been registered to within 20 $\mu$m accuracy to the channels before bonding.

The patterning of both the bottom and top plates employs simple contact printing with flat panel display industry type photomasks onto standard photoresists. Special apparatus was constructed to coat the plates with photoresist and also to expose them with a simple contact printing method. A critical procedure was developed to eliminate microscopic damage to the glass plates before processing begins and to clean the glass plates at the beginning of the processing. This special procedure was essential to reduce the microchannel etching defects by many orders of magnitude that would have otherwise rendered the plates useless for high resolution genome sequencing. Extension of the fabrication and bonding technology should enable very high (400–500) channel count plates to be made that would, in turn, greatly increase the throughput and efficiency of sequencing or chromatography instruments.

While bonding of two glass plates has been illustrated and described, the apparatus and method may be utilized for void-free bonding of multiple glass plates. For example, bonding of three glass plates, two of which are provided with microstructures such as illustrated in FIG. 2, would provide two, two-dimensional planes for microfluidic pathways and enable crossover features for chemical analysis applications. While glass plates have been illustrated and described in the bonding method of the invention, other materials, such as certain plastics and alloys, having similar moderate melting points with a gradual softening point curve can be utilized.

While the vacuum pull down has been described and illustrated as being carried out at one end of the plate, it can be distributed to both ends of the plate or to any number of pull down regions.

Thus the present invention can be utilized to form components for any apparatus using a network of microfluidic channels embedded between plates of glass or similar materials. This invention can be applied to fabrication of analytical capillary-based chemical analytical instruments, such as for chemical electrophoresis, miniature chemical reactor or distribution (fan-in, fan-out) systems; microchannel coolers, radiators or heat exchangers; gas manifold, mixing, and distribution systems; miniature hydraulic systems for power fluidics; and assembly of glass-based substrates onto larger substrates; for example, for integrating flat panel display tiles onto larger display screen systems.

While a particular embodiment of the apparatus, particular embodiments of microstructures in glass plates, and a particular operational sequence have been illustrated and/or described to exemplify and explain the principles of the invention, such are not intended to be limiting. Modification and changes may become apparent to those skilled in the art, and it is intended that the invention be limited only by the scope of the appended claims.

What is claimed is:

1. A method for vacuum fusion bonding of moderate melting point substrates having a gradual softening point curve, comprising:
    providing at least two substrates,
    forming at least microstructures in a surface of a first of the substrates,
    forming openings through a second of the substrates,
    providing a vacuum pumpout block having a vacuum manifold therein and a flat surface on one side thereof,
    providing a blank-off block having a flat surface on one side thereof,
    positioning the second substrate having openings therein on the flat surfaces of said pumpout and blank-out blocks,
    positioning at least the first substrate on the second substrate such that the surface containing the microstructures is facing towards the second substrate,
    aligning and retaining the substrates,
    aligning the vacuum manifold with at least certain openings in the second substrate and aligning the blank-off block with the remaining openings in the second substrate so as to form a sealed space between the first and second substates,
    applying vacuum to within at least the first substrate,
    testing the vacuum within at least the first substrate,
    positioning the substrates, pumpout block and blank-off block on an oven platform, and
    bonding the substrates together.

2. The method of claim 1, wherein the forming of at least microstructures in a surface of at least the first of the substrates is carried out by forming a plurality of microchannels and forming a moat about the microchannels.

3. The method of claim 2, wherein the forming of the openings through the second of the substrates is carried out by forming a plurality of spaced holes which align with at least opposite ends of the microchannels.

4. The method of claim 3, additionally including positioning the vacuum manifold of the pumpout block in alignment with the holes aligned with one end of the microchannels, and positioning the blank-off block over the holes aligned with opposite ends of the microchannels.

5. The method of claim 4, wherein testing the vacuum is carried out by lifting the blank-off block.

6. The method of claim 1, wherein aligning and retaining the substrates is carried out using a removable clamp.

7. The method of claim 6, additionally including removing the removable clamp prior to testing of the vacuum.

8. The method of claim 1, wherein the substrates are selected from the group consisting of glass, plastic, and alloys.

9. The method of claim 1, wherein the forming of the microstructure in a surface of the first of the substrates is carried out so as to form straight microchannels in the substrate.

10. The method of claim 9, wherein the straight microchannels have a length of up to about 50 cm.

11. The method of claim 9, wherein the straight microchannels formed on the surface of the first substrate comprise up to about 100 microchannels having a width of about 10–200 microns and depth of 20–75 microns.

12. The method of claim 1, additionally including distributing the vacuum pull down to both ends of the plate.

13. The method of claim 1, additionally including distributing the vacuum pull down to any number of pull down regions.

* * * * *